US006997171B1

(12) United States Patent
Naruse et al.

(10) Patent No.: US 6,997,171 B1
(45) Date of Patent: Feb. 14, 2006

(54) IGNITION APPARATUS FOR AN INTERNAL COMBUSTION ENGINE

(75) Inventors: Yusuke Naruse, Tokyo (JP); Hisanori Nobe, Tokyo (JP); Mitsuru Koiwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/042,076

(22) Filed: Jan. 26, 2005

(30) Foreign Application Priority Data

Aug. 6, 2004 (JP) .............................. 2004-230962

(51) Int. Cl.
*F02P 1/00* (2006.01)
(52) U.S. Cl. ..................................... 123/609; 123/644
(58) Field of Classification Search ................ 123/609, 123/610, 644, 651
See application file for complete search history.

(56) References Cited

U.S. PATENT DOCUMENTS

| 4,356,807 | A | * | 11/1982 | Tokura et al. | ............... | 123/606 |
| 4,702,221 | A | * | 10/1987 | Tokura et al. | ............... | 123/606 |
| 5,056,497 | A | * | 10/1991 | Akagi et al. | ................ | 123/609 |
| 5,097,815 | A | * | 3/1992 | Oota et al. | ................... | 123/606 |
| 5,337,717 | A | * | 8/1994 | Scheel et al. | ........... | 123/406.19 |
| 6,283,104 | B1 | * | 9/2001 | Ito et al. | ...................... | 123/644 |
| 2001/0037801 | A1 | * | 11/2001 | Ito et al. | ...................... | 123/644 |
| 2002/0056445 | A1 | * | 5/2002 | Inagaki et al. | .............. | 123/609 |

FOREIGN PATENT DOCUMENTS

JP    8-128381 A    5/1996

* cited by examiner

*Primary Examiner*—John T. Kwon
(74) *Attorney, Agent, or Firm*—Sughrue Mion, PLLC (57) ABSTRACT

An ignition apparatus for an internal combustion engine is capable of avoiding mis-ignition even if subject to external disturbances when a fail signal is transmitted through a common signal line on which an ignition signal can also be transmitted. An igniter is connected to receive the ignition signal from an ECU, and includes a waveform shaper connected with the signal line and having an input connected in parallel to an input resistance so as to make a voltage at the input higher than a prescribed voltage when the ignition signal flows into the input resistance, and a pulse output circuit connected to the input and having an output for generating the fail signal into which a secondary coil current is converted. The pulse output circuit adjusts a fail signal current such that the voltage at the input when the fail signal flows into the input resistance becomes less than the prescribed voltage.

5 Claims, 7 Drawing Sheets

IGNITION APPARATUS FOR AN INTERNAL COMBUSTION ENGINE

BACKGROUND OF THE INVENTION

1. Field of the Invention

The present invention relates to an ignition apparatus for an internal combustion engine installed on a vehicle such as for example a motor vehicle. More specifically, the invention relates to an ignition apparatus for an internal combustion engine adapted to generate a high ignition voltage in a secondary coil of an ignition coil by interrupting a current flowing through a primary coil of the ignition coil by means of a switching element.

2. Description of the Related Art

In a known ignition apparatus for an internal combustion engine, a secondary current flowing through a secondary coil of an ignition coil is converted into a corresponding voltage by the use of a detection resistance connected with a low-voltage side of the secondary coil, so that the voltage thus converted is output as a fail signal. In addition, a common signal line is used for an ignition signal line and a fail signal line, and a mask circuit is provided that serves to force the voltage input to a switching element to discharge during the time when a fail signal is being output with an ignition signal being in an off state, so that the switching element for interrupting the supply of current to the ignition coil is prevented from being turned on by the fail signal (for example, see a first patent document: Japanese patent application laid-open No. H8-128381).

In such an ignition apparatus, however, when the switching element is turned on by the ignition signal to supply current to the ignition coil, the mask circuit might be operated by external noise so that the ignition coil could be interrupted at improper timing different from the original proper ignition timing, thus giving rise to mis-ignition or incorrect ignition.

SUMMARY OF THE INVENTION

Accordingly, the object of the present invention is to provide an ignition apparatus for an internal combustion engine which is capable of avoiding mis-ignition or incorrect ignition even if subject to external disturbances during the time when a fail signal is being transmitted through a common signal line on which an ignition signal can be transmitted along with the fail signal.

Bearing the above object in mind, the present invention resides in an ignition apparatus for an internal combustion engine which includes: an electronic control unit that outputs an ignition signal for controlling ignition timing; an igniter connected to receive the ignition signal from the electronic control unit so as to generate an ignition high voltage in a secondary coil of an ignition coil by interrupting a current flowing through a primary coil of the ignition coil through the action of a switching element based on the ignition signal, convert a secondary current flowing through the secondary coil into a fail signal in accordance with ignition of the igniter, and output the fail signal to the electronic control unit; and a signal line on which the ignition signal and the fail signal are both transmitted. The igniter includes: a primary waveform shaping circuit connected with the signal line and having an input connected in parallel to an input resistance so that when the ignition signal flows into the input resistance, a voltage at the input becomes higher than a prescribed reference voltage thereby to turn on the switching element; and a pulse output circuit connected to the input of the primary waveform shaping circuit and having an output for generating the fail signal into which the secondary current is converted, the pulse output circuit being operable to adjust a current value for the fail signal in such a manner that the voltage at the input of the primary waveform shaping circuit at the time when the fail signal flows into the input resistance becomes less than the prescribed reference voltage.

The ignition apparatus for an internal combustion engine according to the present invention is able to achieve the following advantageous effects. That is, when an ignition signal and a fail signal are transmitted on the same signal line, the voltage of the fail signal input to the first waveform shaping circuit is set to be smaller than a voltage that turns on the first waveform shaping circuit. As a result, it is possible to prevent the switching element from being mistakenly turned on by external disturbances.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
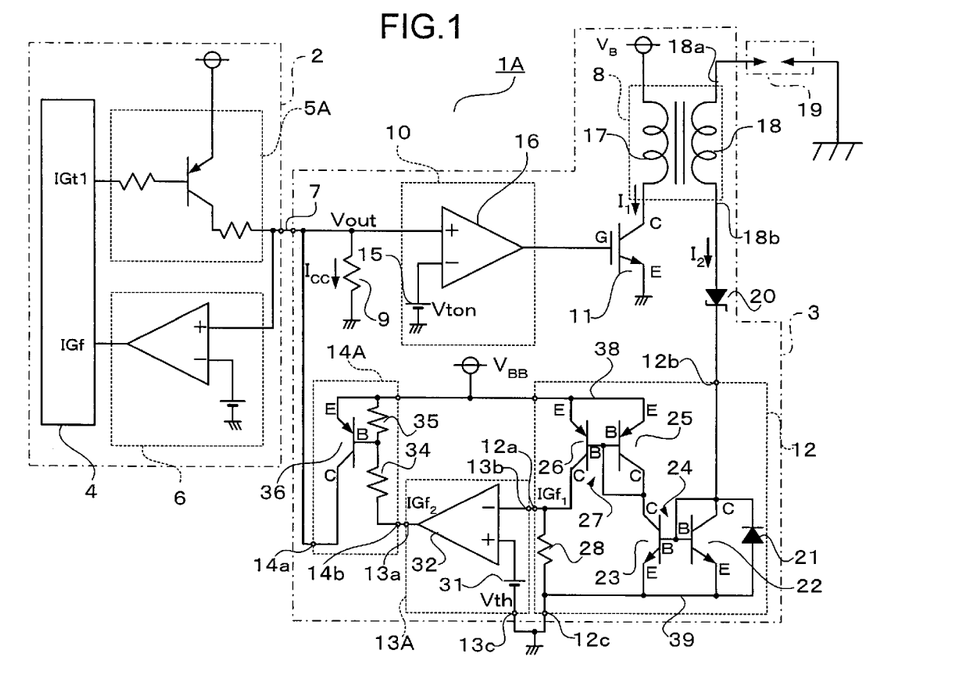
FIG. 1 is a circuit diagram of an ignition apparatus for an internal combustion engine according to a first embodiment of the present invention.
Figure 2:
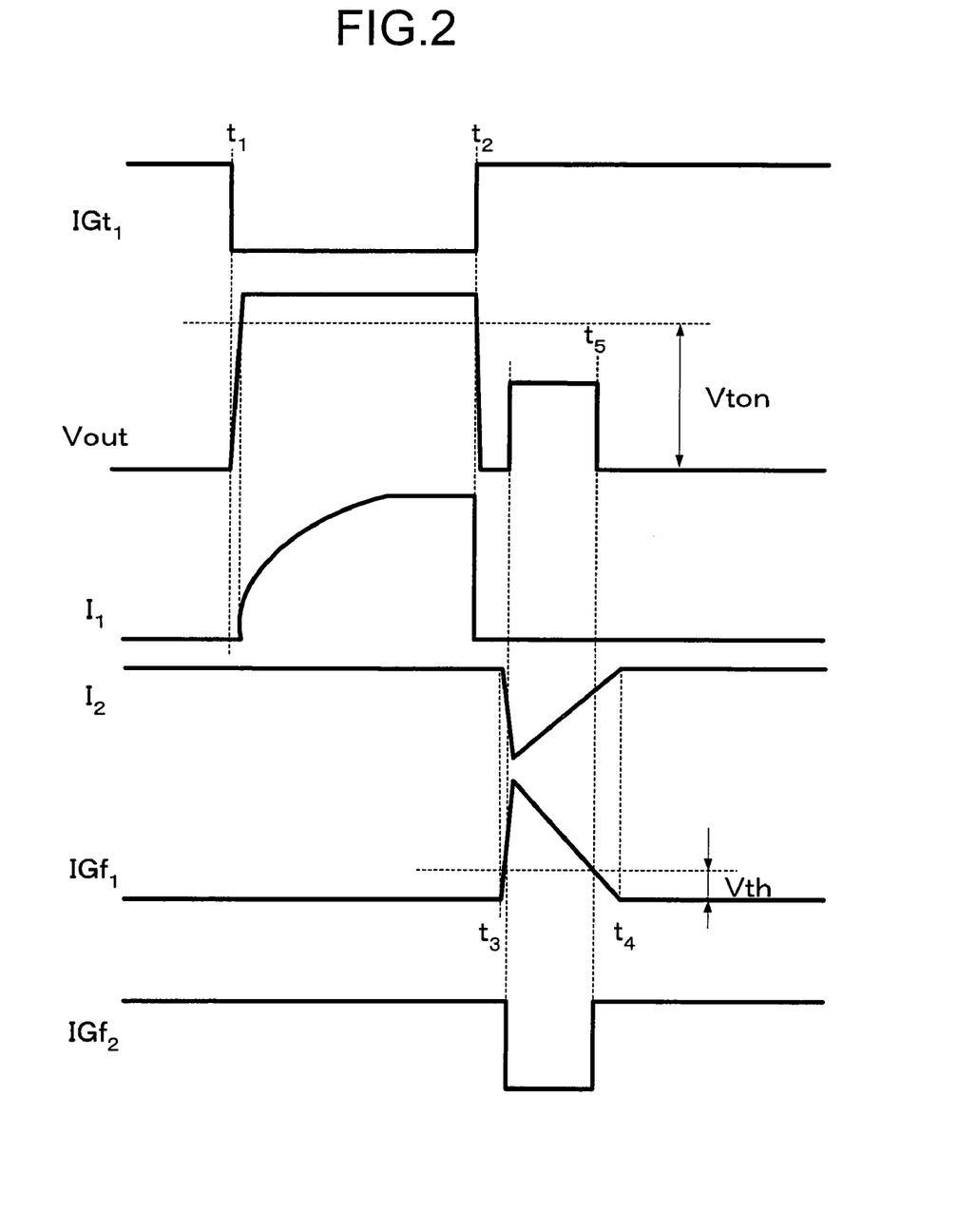
FIG. 2 is a timing chart showing signals at respective parts in the ignition apparatus for an internal combustion engine according to the first embodiment of the present invention.

FIG. 1 is a circuit diagram of an ignition apparatus for an internal combustion engine related according to a first embodiment of the present invention, and FIG. 2 is a timing chart that shows signals at respective parts in the ignition apparatus for an internal combustion engine according to the first embodiment of the present invention.

The ignition apparatus for an internal combustion engine (hereinafter also referred to simply as an engine ignition apparatus), generally designated at a reference symbol 1A, according to this first embodiment is an ignition device used for an internal combustion engine installed on a vehicle such as a motor vehicle. As shown in FIG. 1, this engine ignition apparatus 1A is composed of an electronic control unit (hereinafter referred to as an ECU) 2 and an igniter 3.

The ECU 2 includes an arithmetic processing unit 4, an ignition signal drive circuit 5A and a fail detection circuit 6. The arithmetic processing unit 4 serves to generate an ignition signal $IGt_1$ at desired timing, for instance, time point $t_1$ based on signals from unillustrated sensors or the like, and analyze a fail signal IGf input thereto after ignition. The ignition signal drive circuit 5A causes a current in the form of an ignition signal to flow into the igniter 3 through the signal line 7 based on the ignition signal $IGt_1$ thus input thereto. The fail detection circuit 6 sends only a signal IGf related to the secondary current transmitted from the igniter 3 through the signal line 7 to the arithmetic processing unit 4.

The igniter 3 is constituted by an ignition coil 8, an input resistance 9, a primary waveform shaping circuit 10, a switching element 11, a secondary current detection circuit 12, a secondary waveform shaping circuit 13A and a pulse output circuit 14A.

The primary waveform shaping circuit 10 includes a first reference voltage supply 15 and a first comparator 16, and serves to drive the switching element 11 based on the ignition signal $IGt_1$ from the ignition signal drive circuit 5A.

The switching element 11 comprises an insulated gate bipolar transistor (IGBT), for example, that has a gate terminal G coupled to an output of the first comparator 16, a collector terminal C coupled to a primary coil 17 of the ignition coil 8, and an emitter terminal E coupled to a reference potential point GND such as the body of the motor vehicle. This reference potential point GND is usually called the earth.

The ignition coil 8 has a primary coil 17 and a secondary coil 18, and the primary coil 17 is connected with a power supply terminal VB to which the output of a power source such as a vehicle-mounted battery or the like is connected. A DC voltage output from the vehicle-mounted battery is 12 V for example, so the voltage of the power supply terminal $V_B$ becomes 12 V.

Connected with a high-voltage side 18a of the secondary coil 18 is a spark plug 19 which is arranged in each combustion chamber of the internal combustion engine for igniting or firing fuel such as gasoline supplied to the combustion chamber.

The secondary coil 18 has a low-voltage side 18b connected with an anode of a Zener diode 20 which is connected with the low-voltage side 18b of the secondary coil 18 so as to prevent mis-ignition by suppressing a secondary voltage generated in the secondary coil 18 when the switching element 11 is turned on to cause a primary current $I_1$ to rise in the primary coil 17.

The secondary current detection circuit 12 has three terminals, i.e., an output terminal 12a, an input terminal 12b and a reference potential terminal 12c. The output terminal 12a is connected with the secondary waveform shaping circuit 13A of a subsequent stage, and the input terminal 12b is connected with a cathode of the Zener diode 20, and the reference potential terminal 12c is connected with the reference potential point GND, as in the case of the emitter E of the switching element 11. The secondary current detection circuit 12 converts a secondary current $I_2$, which is generated in the secondary coil 18 after the switching element 11 is interrupted, into a corresponding voltage.

Now, the internal configuration of the secondary current detection circuit 12 will be described below. This secondary current detection circuit 12 has a power supply line 38 and a reference potential line 39. The power supply line 38 is connected with a stabilized power supply $V_{BB}$ to supply a voltage to the secondary current detection circuit 12. For example, the stabilized power supply $V_{BB}$ is an internal power supply of the primary waveform shaping circuit 10. The reference potential line 39 is connected with the reference potential terminal 12c.

This secondary current detection circuit 12 includes a first current mirror circuit 24 comprising a diode 21 and two transistors 22, 23, a second current mirror circuit 27 comprising two transistors 25, 26, and a detection resistance 28.

The diode 21 is to prevent the potential of the input terminal 12b from swinging to a negative potential, and has an anode connected with the reference potential line 39, and a cathode connected with the input terminal 12b.

The transistors 22, 23 are NPN-type bipolar transistors for example, and have their emitters E both coupled to the reference potential line 39, and their bases B connected with each other and coupled to a collector C of the transistor 22. The collector C of the transistor 22 is in turn connected with the input terminal 12b.

In addition, the transistors 25, 26 are PNP-type bipolar transistors for example, and have their emitters E both coupled to the power supply line 38, and their bases B connected with each other and coupled to a collector C of the transistor 25. The transistor 26 has a collector C coupled to one end of the detection resistance 28 and the output terminal 12a. The detection resistance 28 has its other end connected with the reference potential line 39.

The secondary waveform shaping circuit 13A has three terminals, i.e., an output terminal 13a, an input terminal 13b and a reference potential terminal 13c. The output terminal 13a is connected with an input terminal 14b of the pulse output circuit 14A, and the input terminal 13b is connected with the output terminal 12a of the secondary current detection circuit 12, and the reference potential terminal 13c is connected with the reference potential point GND, as in the case of the emitter E of the switching element 11.

The secondary waveform shaping circuit 13A operates in such a manner that when a voltage $IGf_1$, into which the secondary current $I_2$ flowing in the secondary coil 18 is converted by the secondary current detection circuit 12, is higher than or equal to a threshold Vth set by the second reference voltage supply 31, the voltage is pulsated by means of the second comparator circuit 32 and sent to the pulse output circuit 14A.

The internal configuration of the secondary waveform shaping circuit 13A will be described below. This secondary waveform shaping circuit 13A comprises the second reference voltage supply 31 and the second comparator circuit 32. The second comparator circuit 32 has a plus input terminal connected with the second reference voltage supply 31, a minus input terminal connected with the output terminal 12a of the secondary current detection circuit 12, and an output terminal connected with the output terminal 13a.

The pulse output circuit 14A has two terminals, i.e., an output terminal 14a and an input terminal 14b. The output terminal 14a is connected with the plus input terminal of the first comparator 16, and the input terminal 14b is connected with the output terminal 13a of the secondary waveform shaping circuit 13A.

When the output of the secondary waveform shaping circuit 13A changes into a low level, the pulse output circuit 14A causes a collector current Icc to flow into the input resistance 9.

The internal configuration of the pulse output circuit 14A will be described below. The pulse output circuit 14A comprises current regulation resistances 34, 35 and a transistor 36. The input terminal 14b is connected with one end of the current regulation resistance 34 which has the other end connected with a base B of the transistor 36. In addition, the current regulation resistance 34 is also connected at the other end thereof with the power supply line 38 through the current regulation resistance 35. The transistor 36 has an emitter E connected with the power supply line 38, and a collector C connected with the output terminal 14a.

Next, the operation of the engine ignition apparatus 1A will be described while referring to FIG. 2.

The ignition signal $IGt_1$ is input from the arithmetic processing unit 4 to the first comparator 16 through the ignition signal drive circuit 5A at time point $t_1$. When a voltage Vout at the plus input terminal of the first comparator 16 becomes higher than or equal to a reference voltage Vton that is set by the first reference voltage supply 15, the switching element 11 is turned on to supply the primary current $I_1$ to the primary coil 17.

Thereafter, when the voltage Vout at the plus input terminal of the first comparator 16 decreases to less than the reference voltage Vton at time point $t_2$, the switching element 11 is turned off.

At the moment when the switching element 11 is turned off, the primary current $I_1$ flowing in the primary coil 17 is interrupted, whereby a high voltage is generated in the collector C of the switching element 11.

This high voltage is converted into a negative voltage in the secondary coil 18 capable of breaking electrical insulation in a gap between electrodes of the spark plug 19. At time point $t_3$ at which the electrical insulation in the gap between the electrodes of the spark plug 19 is broken, the secondary current $I_2$ flows from the spark plug 19 to the base B of the transistor 22 through the secondary coil 18 and the Zener diode 20. At this moment, the transistor 22 is turned on to operate the first current mirror circuit 24.

The transistor 23 of the first current mirror circuit 24 draws in a collector current corresponding to the secondary current $I_2$ from the transistor 25, so that current flows through the base of the transistor 25. Thus, the transistor 25 is turned on to operate the second current mirror circuit 27, whereby a current corresponding to the secondary current $I_2$ is supplied from the transistor 26 to the detection resistance 28, and the secondary current $I_2$ is converted into the voltage $IGf_1$. The discharge continues until the energy of the ignition coil 8 is lost, so the secondary current $I_2$ keeps flowing until time point $t_4$.

When the threshold Vth or more to which the voltage $IGf_1$, into which the secondary current $I_2$ is converted, reaches the threshold Vth or above set by the second reference voltage supply 31, the output of the second comparator circuit 32 is changed into a low level, so a signal $IGf_2$ of a low level is output until time point $t_5$ at which the voltage $IGf_1$ becomes equal to or less than the threshold Vth. When the output of the second comparator circuit 32 is changed into a low level, current is caused to flow from the stabilized power supply $V_{BB}$ into the output of the second comparator circuit 32 through the power supply line 38 and the current regulation resistances 35, 34. As a result, current is caused to flow through the base of the transistor 36, whereby the transistor 36 is turned on. Since the collector current of the transistor 36 thus turned on is decided by the base voltage of the transistor 36, the voltage $V_{BB}$ of the power supply line 38 is stabilized. Also, the base voltage of the transistor 36 is decided by the voltage divided between the current regulation resistance 34 and the current regulation resistance 35, so the collector current $I_{CC}$ upon the transistor 36 being turned on is kept constant, and this collector current $I_{CC}$ is caused to flow through the input resistance 9.

Here, by setting the current value of the collector current $I_{CC}$ and the resistance value of the input resistance 9 so that a voltage drop generated by the collector current $I_{CC}$ flowing through the input resistance 9 becomes equal to or less than the reference voltage Vton, a fail signal can be supplied to the fail detection circuit 6 without turning on the first comparator 16. As a result, a desired signal IGf is taken out of this fail signal by the fail detection circuit 6, so that a variety of kinds of diagnoses can be carried out based on the signal IGf in the ECU 2. For example, a short mode such as surface leakage of the secondary coil 18 and the spark plug 19 and the like can be detected according to the pulse width of the signal IGf.

Since the same current as the secondary current $I_2$ flowing through the secondary coil 18 is caused to flow into the detection resistance 28 via the two current mirror circuits 24, 27, there is generated the voltage $IGf_1$ across the opposite ends of the detection resistance 28, which is proportional to the secondary current $I_2$, and when the voltage $IGf_1$ becomes greater than the threshold Vth set by the second reference voltage supply 31, the output of the second comparator circuit 32 is changed into a low level.

Thus, even if noise is carried on the power supply line 38 or the reference potential line 39 with which the two current mirror circuits 24, 27 are connected, the output of the second comparator circuit 32 will not change as long as the noise is less than the threshold Vth, so it is possible to obtain the secondary waveform shaping circuit 13A that is robust against external disturbances.

In addition, when the output of the second comparator circuit 32 is changed into a low level, the collector current $I_{CC}$ is caused to flow from the pulse output circuit 14A into the input resistance 9, and the voltage Vout at the plus input terminal of the first comparator 16 is equal to the voltage drop across the input resistance 9 due to the resistance value of the input resistance 9 and the current value of the collector current $I_{CC}$. Accordingly, the collector current $I_{CC}$ and the resistance value of the input resistance 9 has only to be set in such a manner that the voltage Vout becomes smaller than the reference voltage Vton of the first reference voltage supply 15.

The collector current $I_{CC}$, being obtained from the stabilized power supply line 38 in this manner, is highly resistant to the influence of external noise.

Moreover, since the secondary current $I_2$ flowing through the secondary coil 18 is taken in directly to the current mirror circuit 24, the entire circuitry can be simplified.

In such an engine ignition apparatus, even if an ignition signal and a fail signal are transmitted by the common signal line, it is adjusted by a combination of the constant current and the resistance such that the amplitude of the fail signal does not exceed the threshold at which the switching element is turned on. Accordingly, it never happens that the switching element is turned on by mistake even if external noise is carried on the power supply or the earth.

Embodiment 2

Figure 3:
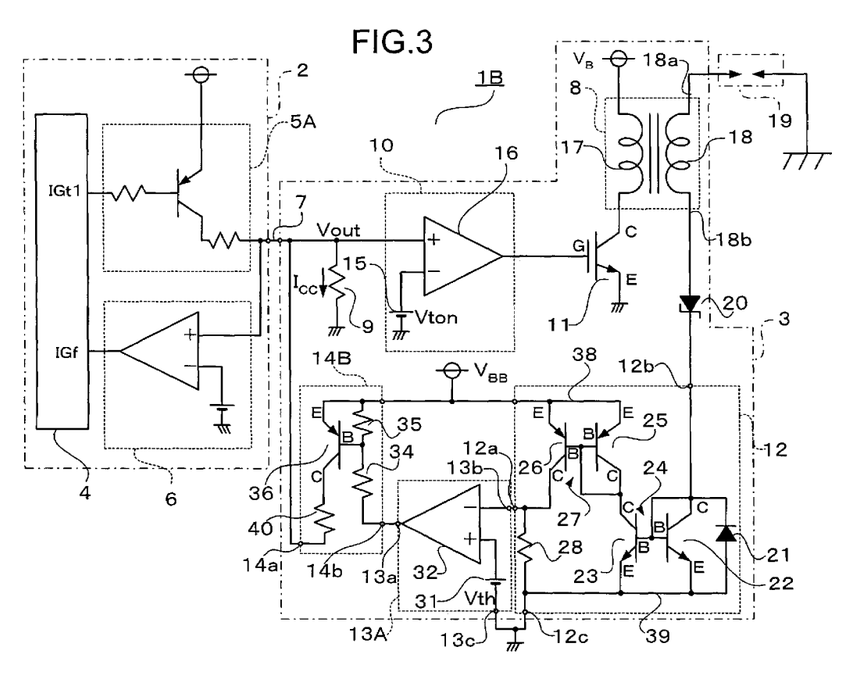
FIG. 3 is a circuit diagram of an ignition apparatus for an internal combustion engine according to a second embodiment of the present invention.

FIG. 3 is a circuit diagram of an ignition apparatus for an internal combustion engine according to a second embodiment of the present invention.

The engine ignition apparatus, generally designated at a reference numeral 1B, according to this second embodiment is different from the above-mentioned engine ignition apparatus 1A according to the first embodiment in a pulse output circuit 14B, but the other construction of this embodiment is similar to the first embodiment, and hence like parts are identified by like symbols while omitting a detailed explanation thereof.

As shown in FIG. 3, this pulse output circuit 14B is different from the one 14A in that an output resistance 40 is added to the pulse output circuit 14A of the first embodiment. The output resistance 40 has one end connected with the collector C of the transistor 36, and the other end connected with the output terminal 14a.

Since the operation of the engine ignition apparatus 1B according to the second embodiment is different from the engine ignition apparatus 1A of the first embodiment only in the operation of the pulse output circuit 14B, only a different part will be described below while omitting an explanation of the other parts.

When the output of the second comparator circuit 32 changes into a low level, current is caused to flow into the current regulation resistances 34, 35, so that the voltage at the base B of the transistor 36 becomes smaller than the voltage $V_{BB}$. As a result, the transistor 36 is turned on, whereby collector current $I_{CC}$ based on the ratio between the resistance values of the current regulation resistances 34, 35 is caused to flow into the input resistance 9 via the output resistance 40. The voltage Vout at the plus input terminal of the first comparator 16 is the voltage of the power supply $V_{BB}$ dropped or decreased by the emitter-collector voltage of the transistor 36 and further voltage divided by the input resistance 9 and the output resistance 40. The resistance values of the output resistance 40 and the input resistance 9 are beforehand decided in such a manner that this voltage drop (i.e., the emitter-collector voltage of the transistor 36) becomes smaller than the reference voltage Vton set by the first reference voltage supply 15.

In such an engine ignition apparatus, when the transmission of an ignition signal and a fail signal is performed on the same signal line, the amplitude of the fail signal is suppressed so as to maintain the first waveform shaping circuit in an off state, as in the first embodiment. As a result, it is possible to prevent the switching element 11 from being mistakenly turned on by external disturbances.

In addition, since the output resistance 40 is connected with the collector C of the transistor 36, the collector current $I_{CC}$ flowing from the transistor 36 into the input resistance 9 becomes more stable than that in the first embodiment.

Embodiment 3

Figure 4:
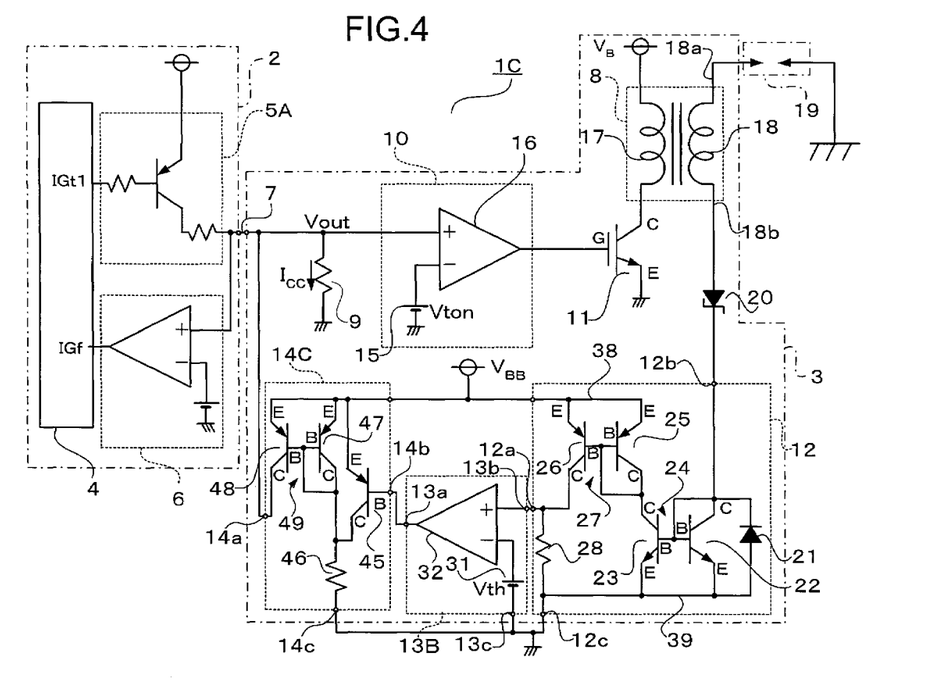
FIG. 4 is a circuit diagram of an ignition apparatus for an internal combustion engine according to a third embodiment of the present invention.

FIG. 4 is a circuit diagram of an ignition apparatus for an internal combustion engine according to a third embodiment of the present invention.

The engine ignition apparatus, generally designated at a reference numeral 1C, according to this third embodiment is different from the above-mentioned engine ignition apparatus 1A according to the first embodiment in a pulse output circuit 14C, but the other construction of this embodiment is similar to the first embodiment, and hence like parts are identified by like symbols while omitting a detailed explanation thereof.

The pulse output circuit 14C according to this third embodiment is composed of a current mirror circuit 49 comprising a transistor 45, a constant current resistance 46 and transistors 47, 48.

The second comparator circuit 32 has a plus input terminal connected with the input terminal 13b, and a minus input terminal connected with the second reference voltage supply 31.

The second comparator circuit 32 has its output connected with a base B of the transistor 45, which has an emitter E connected with the power supply line 38, and a collector C connected with the output terminal 14a. The collector C of the transistor 45 is also connected with the reference potential line 39 through the constant current resistance 46.

For example, the transistors 47, 48 are PNP bipolar transistors, and have their emitters E both coupled to the power supply line 38, and their bases B connected with each other and coupled to a collector C of the transistor 47. The transistor 48 has a collector C coupled to the output terminal 14a.

Since the operation of the engine ignition apparatus 1C of the third embodiment is similar to the one 1A of the first embodiment 1 up to the time when an input 14b is supplied to the pulse output circuit 14C, and hence an explanation of similar parts is omitted.

When the output of the second comparator circuit 32 changes into a zero level, the transistor 45 is turned on to cause current to flow into the constant current resistance 46, whereby a collector current $I_{CC}$ flowing in the collector C of the transistor 48 of the current mirror circuit 49 is caused to flow into the input resistance 9.

In such an engine ignition apparatus, when the transmission of an ignition signal and a fail signal is performed on the same signal line, the amplitude of the fail signal is suppressed so as to maintain the first waveform shaping circuit in an off state, as in the first embodiment. As a result, it is possible to prevent the switching element 11 from being mistakenly turned on by external disturbances.

Further, since the collector current flowing through the input resistance 9 is supplied by the current mirror circuit 49, the influence of external noise on that current is smaller than that in the first embodiment, thus making it possible to keep the voltage of the fail signal much more constant.

Embodiment 4

Figure 5:
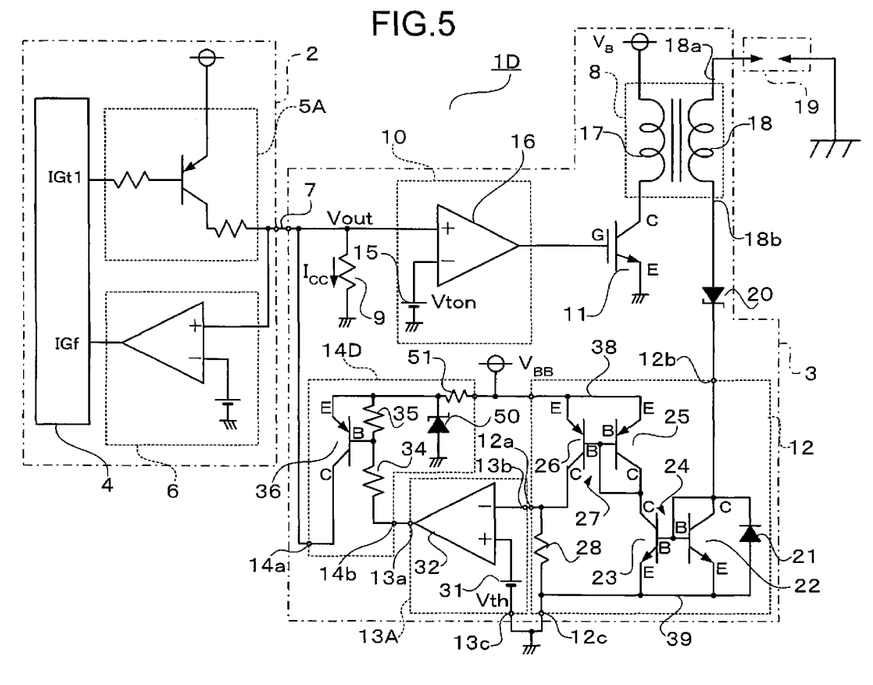
FIG. 5 is a circuit diagram of an ignition apparatus for an internal combustion engine according to a fourth embodiment of the present invention.

FIG. 5 is a circuit diagram of an engine ignition apparatus according to a fourth embodiment of the present invention. The engine ignition apparatus, generally designated at a reference numeral 1D, according to this fourth embodiment is different from the above-mentioned engine ignition apparatus 1A according to the first embodiment in a pulse output circuit 14D, but the other construction of this embodiment is similar to the first embodiment, and hence like parts are identified by like symbols while omitting a detailed explanation thereof.

As shown in FIG. 5, the pulse output circuit 14D includes a clamp circuit 50 that is connected with the power supply line 38 through a resistance 51. For example, the clamp circuit 50 is composed of a Zener diode or a plurality of diodes connected with one another in a multi-layer overlapped manner. The emitter E of the transistor 36 and the current regulation resistance 35 are connected with a junction between the resistance 51 and the clamp circuit 50.

The clamp circuit 50 is connected with the emitter E of the transistor 36 as a load, whereby even if a base current at the base B of the transistor 36 increases to make the emitter E enter a saturation region, the voltage of the emitter E does not fall under the clamping action of the clamp circuit 50.

In such an engine ignition apparatus, when the transmission of an ignition signal and a fail signal is performed on the same signal line, the amplitude of the fail signal is suppressed so as to maintain the first waveform shaping circuit in an off state, as in the first embodiment. Accordingly, it is possible to prevent the switching element 11 from being mistakenly turned on by external disturbances.

In addition, since the clamp circuit is connected with the transistor of the pulse output circuit, it is possible to ensure an appropriate margin for malfunctions when a secondary current is detected to generate a pulse output. As a result, the apparatus becomes less prone to be influenced by external noise.

Embodiment 5

Figure 6:
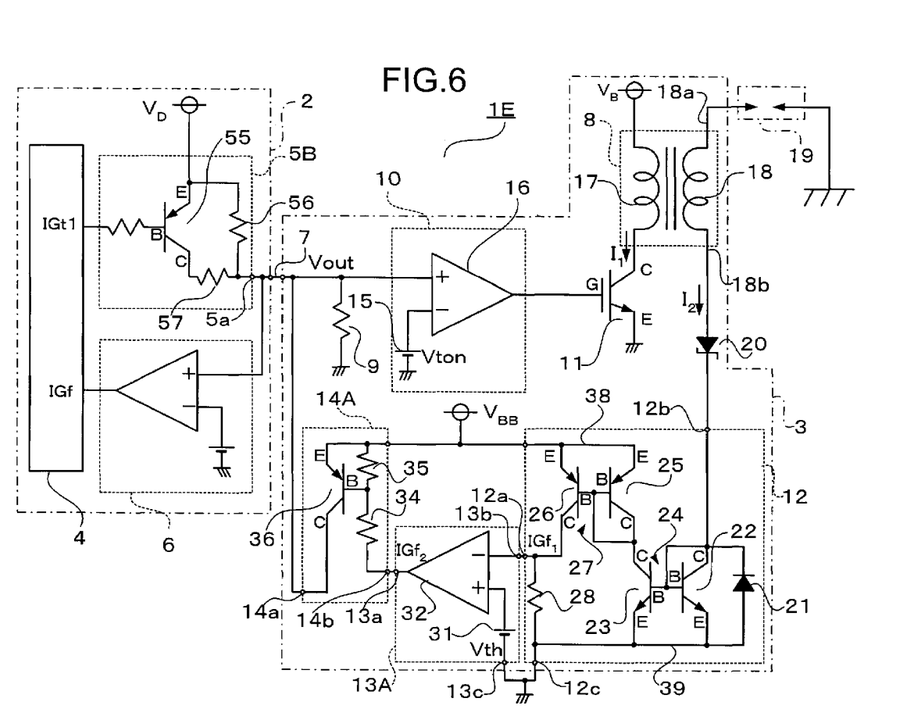
FIG. 6 is a circuit diagram of an ignition apparatus for an internal combustion engine according to a fifth embodiment of the present invention.
Figure 7:
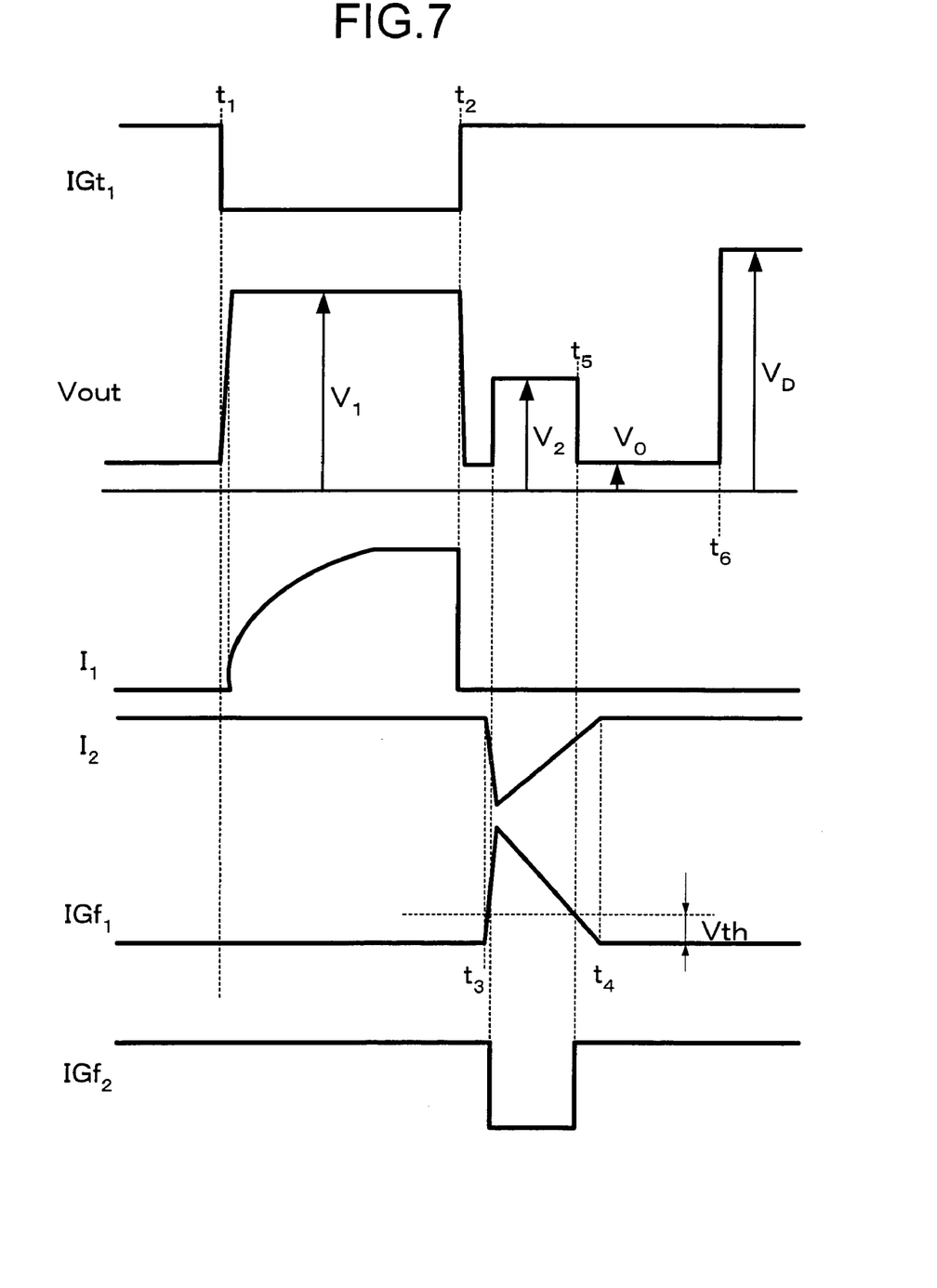
FIG. 7 is a timing chart showing signals at respective parts in the ignition apparatus for an internal combustion engine according to the fifth embodiment of the present invention.

FIG. 6 is a circuit diagram of an engine ignition apparatus according to a fifth embodiment of the present invention. FIG. 7 is a timing chart for signals in respective parts of the engine ignition apparatus according to the fifth embodiment.

The engine ignition apparatus, generally designated at a reference numeral 1E, according to this fifth embodiment is different from the above-mentioned engine ignition apparatus 1A according to the first embodiment in an ignition signal drive circuit 5B, but the other construction of this embodiment is similar to the first embodiment, and hence like parts are identified by like symbols while omitting a detailed explanation thereof.

This ignition signal drive circuit 5B includes a transistor 55 that has an emitter E connected with the output terminal 5a through a resistance 56, so that the voltage at the plus input terminal of the first comparator 16 becomes a little higher than a reference potential due to the current flowing from the resistance 56 to the input resistance 9.

Next, the operation of the engine ignition apparatus 1E will be described while referring to FIG. 7.

The operation of this embodiment up to the time point $t_4$ is similar to that of the first embodiment, and hence an explanation of similar parts is omitted. Here, it should be noted that unlike the case of the first embodiment, the potential Vout at the plus input terminal of the first comparator 16 becomes a voltage $V_0$ a little higher than the reference potential at the time when neither ignition signal nor fail signal is input. That is, current flows from a power supply $V_D$ inside the ECU 2 via the resistance 56 and the input resistance 9. If the resistance value of this resistance 56 is set to be about 10 times as large as the resistance value of the input resistance 9, the value of the voltage $V_0$ becomes 1/11 of the power supply voltage $V_D$. When an ignition signal $IGt_1$ is input to the base B of the transistor 55, the transistor 55 is turned on so that current flows from the collector C of the transistor 55 to the input resistance 9 mainly through the resistance 57. When the resistance value of this resistance 57 is made about half of the input resistance 9, a voltage $V_1$ across the input resistance 9 becomes 2/3 of the power supply voltage $V_D$. The power supply voltage $V_D$, the resistance value of the resistance 57 and the resistance value of the input resistance 9 are determined in such a manner that the voltage $V_1$ becomes larger than the reference voltage Vton set by the first reference voltage supply 15.

In addition, when the transistor 36 is turned on and current flows into the input resistance 9, a voltage drop $V_2$ across the input resistance 9 becomes smaller than the reference voltage Vton by adjusting the value of the current from the pulse output circuit 14A.

Moreover, when the signal line 7 is broken or disconnected at time point $t_6$, the voltage at the output terminal 5a of the ignition signal drive circuit 5B jumps to the power supply voltage $V_D$. This voltage is input from the fail detection circuit 6 to the arithmetic processing apparatus 4, so that the presence or absence of a break or open-circuit of the signal line 7 is determined from the magnitude of the voltage thus input. That is, the voltage of the output terminal 5a is set to become larger in the order of the fail signal $V_2$, the ignition signal $V_1$ and the break signal $V_D$.

In such an engine ignition apparatus, output voltages for an ignition signal, a fail signal and a signal generated upon breaking or open-circuiting of a signal line are set respectively, so that a break or open-circuit of the signal line can be detected in a reliable manner, thus making it possible to improve the reliability of the apparatus.

While the invention has been described in terms of preferred embodiments, those skilled in the art will recognize that the invention can be practiced with modifications within the spirit and scope of the appended claims.

What is claimed is:

1. An ignition apparatus for an internal combustion engine, comprising:
   an electronic control unit that outputs an ignition signal for controlling ignition timing;
   an igniter connected to receive said ignition signal from said electronic control unit so as to generate an ignition high voltage in a secondary coil of an ignition coil by interrupting a current flowing through a primary coil of said ignition coil through the action of a switching element based on said ignition signal, convert a secondary current flowing through said secondary coil into a fail signal in accordance with ignition of said igniter, and output the fail signal to said electronic control unit; and
   a signal line on which said ignition signal and said fail signal are both transmitted;
   said igniter comprising:
   a primary waveform shaping circuit connected with said signal line and having an input connected in parallel to an input resistance so that when said ignition signal flows into said input resistance, a voltage at said input becomes higher than a prescribed reference voltage thereby to turn on said switching element; and
   a pulse output circuit connected to said input of said primary waveform shaping circuit and having an output for generating said fail signal into which said secondary current is converted, said pulse output circuit being operable to adjust a current value for said fail signal in such a manner that the voltage at said input of said primary waveform shaping circuit at the time when said fail signal flows into said input resistance becomes less than said prescribed reference voltage.

2. The ignition apparatus for an internal combustion engine as set forth in claim 1, wherein said pulse output circuit includes a current mirror circuit that outputs said fail signal.

3. The ignition apparatus for an internal combustion engine as set forth in claim 1, wherein said pulse output circuit includes a clamp circuit that clamps said fail signal so as to prevent said fail signal from becoming a voltage higher than or equal to said prescribed reference voltage.

4. The ignition apparatus for an internal combustion engine as set forth in claim 1, wherein said igniter includes a secondary current detection circuit with a current mirror circuit connected with a low-voltage side of said secondary coil.

5. The ignition apparatus for an internal combustion engine as set forth in claim 1, wherein a voltage on said signal line at its side near said electronic control unit at the time when said signal line is broken is higher than the voltage at said input of said primary waveform shaping circuit at the time when said ignition signal and said fail signal flow into said input resistance, respectively.

* * * * *